(12) United States Patent
Dunn et al.

(10) Patent No.: US 8,334,604 B1
(45) Date of Patent: Dec. 18, 2012

(54) INTEGRATED EXTERNAL COMBUSTION CAM ENGINE-GENERATOR

(75) Inventors: Paul M. Dunn, West Kingston, RI (US); Christopher J. Egan, South Kingston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 322 days.

(21) Appl. No.: 12/894,538

(22) Filed: Sep. 30, 2010

(51) Int. Cl.
- *F02B 53/04* (2006.01)
- *H02K 21/10* (2006.01)
- *H02K 21/14* (2006.01)

(52) U.S. Cl. .......... 290/1 A; 123/2; 123/45 R; 123/45 A

(58) Field of Classification Search .......... 290/1 A; 123/2, 45 R, 45 A, 56.2, 56.7, 149 R, 149 A; 310/75 R, 67 R
See application file for complete search history.

(56) References Cited

U.S. PATENT DOCUMENTS

| | | | |
|---|---|---|---|
| 4,437,016 A * | 3/1984 | Nakaya et al. | 290/1 R |
| 4,486,667 A * | 12/1984 | Srogi | 290/1 R |
| 4,653,438 A * | 3/1987 | Russell | 123/44 B |
| 4,831,972 A * | 5/1989 | Barnwell | 123/46 R |
| 4,960,082 A * | 10/1990 | Sullivan et al. | 123/43 A |
| 5,343,704 A * | 9/1994 | Kanzaki et al. | 60/525 |
| 5,397,922 A * | 3/1995 | Paul et al. | 290/1 A |
| 5,546,901 A * | 8/1996 | Acker et al. | 123/195 C |
| 5,636,599 A * | 6/1997 | Russell | 123/44 B |
| 6,174,139 B1 * | 1/2001 | Stolzer | 417/222.1 |
| 6,230,670 B1 * | 5/2001 | Russell | 123/44 B |
| 6,236,123 B1 * | 5/2001 | Pinkerton | 310/12.12 |
| 6,390,052 B1 * | 5/2002 | McMaster et al. | 123/247 |
| 6,968,751 B2 * | 11/2005 | Shulenberger et al. | 74/60 |
| 7,076,950 B2 * | 7/2006 | Klostermann | 60/513 |
| 7,334,513 B2 * | 2/2008 | Belser | 92/12.2 |
| 7,400,069 B2 * | 7/2008 | Kundel | 310/20 |
| 8,113,165 B2 * | 2/2012 | Russell | 123/149 A |
| 2008/0271715 A1 * | 11/2008 | duPont | 123/51 B |
| 2010/0127507 A1 * | 5/2010 | Hyde et al. | 290/1 R |

FOREIGN PATENT DOCUMENTS

DE 19943993 * 3/2001

* cited by examiner

*Primary Examiner* — Burton Mullins
(74) *Attorney, Agent, or Firm* — James M. Kasischke; Michael P. Stanley; Jean-Paul A. Nasser

(57) ABSTRACT

An integrated engine and generator is provided and includes a stationary non-rotating shaft. An engine block is provided that is capable of rotation about the shaft. The engine block comprises a plurality of cylinders with each cylinder including a piston translating in rectilinear motion while rotating about the shaft. A stationary generator housing and stator surrounds the block and has stator windings wound into the housing. Magnets are affixed to an outer surface of the block to rotate with the block, with the magnets separated from the housing by an air gap. The stator windings are electrically configured to match pole pairs of the magnets in order to generate electrical current upon block rotation.

8 Claims, 2 Drawing Sheets

INTEGRATED EXTERNAL COMBUSTION CAM ENGINE-GENERATOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

1. Field of the Invention

The present invention is directed generally to a compact engine-generator (or alternator) combination, and specifically to a more compact engine-generator for use with unmanned submersibles (hereinafter called Unmanned Undersea Vehicles or UUVs).

2. Description of the Prior Art

An Undermanned Undersea Vehicle (UUV), which operates independent of air, must use thermal engines with air-independent fuels, or use electric power with energy delivered via primary batteries, secondary batteries, fuel cells, etc. The range of the UUVs can be significantly increased if an air breathing engine is used to recharge the batteries. This technique has not yet been accepted in UUVs since the diesel engine and generator occupy a large amount of space and weight; thereby, leaving little allocation for fuel storage and batteries. This technique is also not acceptable due in part to acoustic signature considerations. If a quiet, compact air breathing generator could be constructed, then this type of propulsion system would be of greater benefit.

Various engine types are commonly-available, such as a spark ignition combustion engine, a compression ignition internal combustion engine and an external combustion engine. These engines can be powered by either a monopropellant or bipropellant fuel/oxidizer energy source.

U.S. Pat. No. 5,343,704 to Kanzaki et al. discloses a double-headed and swash plate type engine which includes double headed pistons defining front spaces and rear spaces and anchored to the swash plate by shoes. Hence, the reciprocal movement of the double-headed pistons, due to the expansion and compression of an operating gas in the front and rear spaces, is directly converted into the rotary movement of the swash plate.

U.S. Pat. No. 4,960,082 to Sullivan et al. discloses a bent axis rotary piston engine with the capability of dual output power, improved cooling and gas flow through the engine, as well as supercharging and improved scavenging of the exhaust.

U.S. Pat. No. 6,390,052 to McMaster et al. discloses a wobble plate engine having a wobble plate that rolls against truncated cone portions of a housing and has an inner extremity rotatably supported by an axially inclined annular bearing on a spherical member of the wobble plate assembly so as to rotate a shaft during the wobbling motion.

U.S. Pat. No. 7,334,513 to Belser discloses an axial piston machine having a swash plate and a control piston which contacts the swash plate by way of a side block which is partially received by the swash plate or the control piston.

U.S. Pat. No. 6,968,751 to Shulenberger et al. discloses a system and method for converting reciprocal linear motion of one or more pistons into rotary motion of an output power shaft whose rotational axis is parallel to the motions of the pistons, or conversely rotary motion of a similarly configured input shaft into reciprocal linear motion of one or more pistons.

U.S. Pat. No. 6,174,139 to Stolzer discloses an axial piston machine which includes a cylinder block having cylinder bores in which pistons are movably guided, with the pistons being supported on an inclined or wobble plate in order to perform a lifting movement.

U.S. Patent Publication No. 2008/0271715 to duPont discloses an internal combustion two-stroke barrel engine including a power output shaft configured to rotate an even number of cylinders around the output shaft, where each cylinder includes opposing first and second power pistons configured to reciprocate within their respective power cylinder, and a pair of non-rotating wobble plates opposed and hingedly-connected to the power pistons.

U.S. Pat. No. 6,236,123 to Pinkerton discloses an electrical generator having at least one rotating ring of field magnets which produce a circular array of magnetic fields, and a ring of generator output coils which are in the magnetic fields. Pinkerton's machine is shaft driven, much like a conventional generator. Pinkerton does not disclose a piston engine with a rotating block. Specifically, Pinkerton discloses that a motor rotates a shaft, an optional flywheel, and a generator magnet assembly. Also, Pinkerton describes an ability to move the coils via an actuator to change voltage.

U.S. Pat. No. 7,400,069 to Kundel discloses a generator for producing electric power including a drive mechanism (such as a drive motor) having a rotor supported for rotation about an axis, first and second generator magnets to produce a magnetic field whose flux extends between reference poles of the magnets, plus a stator with an electrical conductor winding located adjacent to the magnets.

SUMMARY OF THE INVENTION

Accordingly it is a primary object and general purpose of the present invention to provide a lighter, more compact engine and generator combination for use in UUVs.

To attain the object described, the present invention provides an integrated engine and generator including a stationary non-rotating shaft and an engine block rotating about the shaft with a plurality of cylinders. Each cylinder includes a piston translating in rectilinear motion while rotating about the shaft.

The engine and generator also includes a stationary generator housing and stator surrounding the engine block and having stator windings wound into the generator housing.

Permanent magnets are affixed to an outer curvilinear surface of the engine block to rotate with the engine block. The magnets are separated from the generator housing by a controlled dimension air gap. Provided stator windings are electrically configured to match pole pairs of the permanent magnets to generate induced electrical current upon engine block rotation.

Standard diesel-electric powerplants have separately housed engine and generator devices operationally connected on a common shaft, whereas the present invention combines the thermal engine portion and permanent magnet generator portion into a single integrated system. This system reduces size and weight and enables smaller and lighter engine-generator systems for UUV applications.

The rotating block engine design used in the present invention enables integration of the generator with the engine.

Also, the multi-lobe cam enables balance of axial forces resulting in reduced axial vibration.

These and other objects and advantages of the present invention will become apparent from the following description, drawings and claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
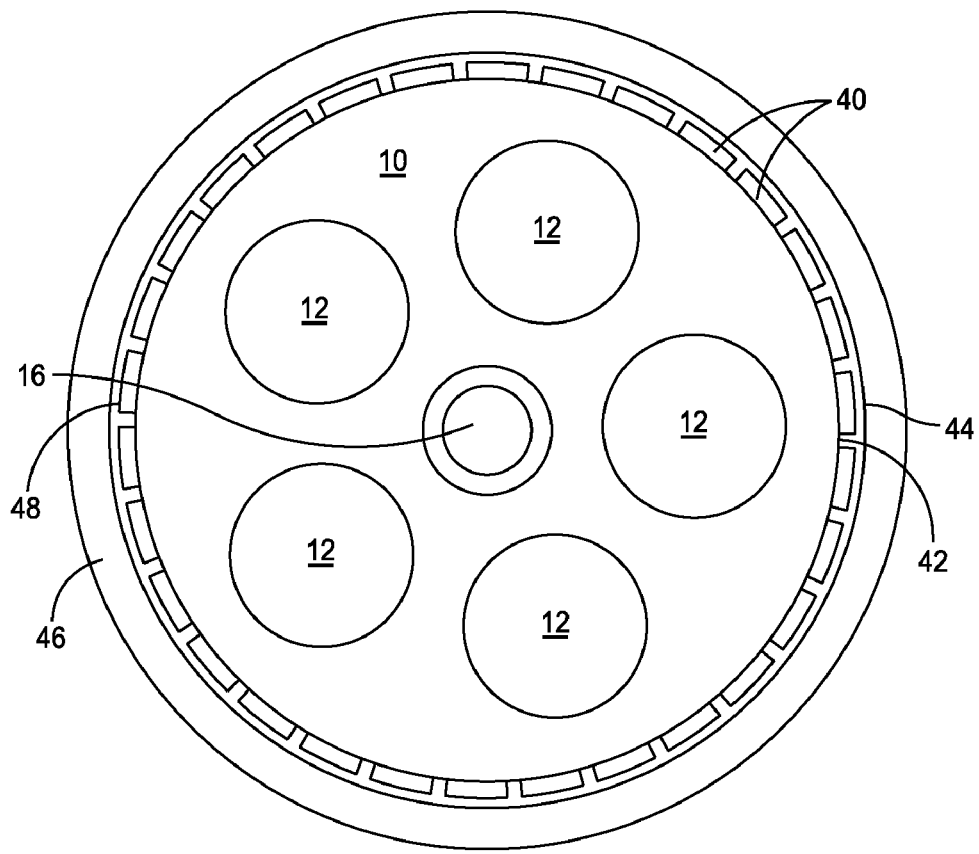
FIG. 1 is an axial cutout view of an integrated external combustion swash plate engine and generator according to the present invention.
Figure 2:
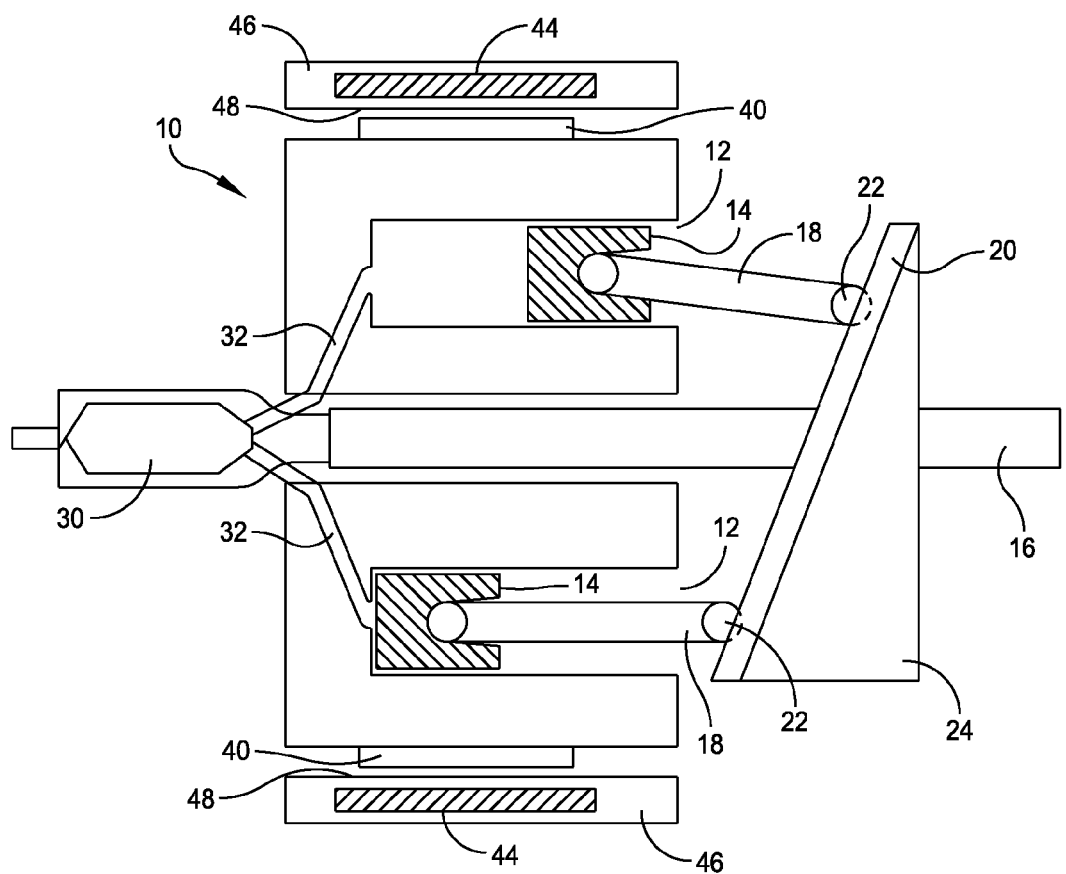
FIG. 2 is a cross-sectional view of the integrated combustion swash plate engine and generator of FIG. 1 according to the present invention.

FIG. 1 and FIG. 2 illustrate a preferred embodiment of a rotating block external combustion cam piston engine. According to the present invention, the engine block rotates about a stationary shaft. The rotating engine block has permanent magnets that are fixedly-attached (either surface-mounted or embedded) to the outer cylindrical surface of the engine block. These magnets rotate within a fixed stator coil, forming the rotating component of the alternator or generator.

In the figures, the rotating engine block 10 is configured with a number of cylinders 12 in which pistons 14 translate in rectilinear motion while rotating with the engine block about a shaft 16. In the preferred embodiment, five cylinders are shown although this number can vary as needed.

The pistons 14 are attached by connecting rods 18 to a cam-follower wobble plate 20 and a bearing assembly 22. The stationary shaft 16 and a swash plate 24 are fixed together and remove the rotating moment of the rotating block and piston assembly.

The engine block 10 rotates at the same rotational speed as the cam follower or wobble plate 20. Fuel and oxidizer mixture is ported into a combustion chamber 30 and hot combustion gas enters the cylinders 12 through inlet tubes 32 imparting an axial force on the pistons 14; thereby, resulting in rotary motion of the engine block 10.

Permanent magnets 40 are fixedly attached to an outer cylindrical surface 42 of the rotating engine block 10; thereby rotating with the block. Stator windings 44 are wound into a stationary generator housing 46 in an appropriate electrical configuration to match the number of permanent magnet pole pairs and to generate induced electrical current upon engine block rotation. The magnets 40 and stationary housing 46 are separated by a controlled dimension air-gap 48 through which magnetic flux passes.

The rotating engine block 10 is configured with a working gas inlet and exhaust valve ports (not shown) to control the sequence of working fluid flow to/from the cylinders 12, and cooling channels to remove heat from the engine and generator. The stationary housing 46 could also be configured with cooling channels to enable heat removal from the stator 44.

The engine portion of the integrated engine-generator system can be configured as a spark-ignition internal combustion engine or a compression-ignition internal combustion engine. Furthermore, the engine can be powered by either a mono-propellant or a bi-propellant fuel/oxidizer energy source.

The generator portion of the integrated engine-generator system can be configured with either surface-mounted or embedded permanent magnets, and can make use of either straight or skewed magnets and/or stator slots.

It will be understood that many additional changes in the details, materials, steps and arrangement of parts, which have been herein described and illustrated in order to explain the nature of the invention, may be made by those skilled in the art within the principle and scope of the invention as expressed in the appended claims. Also, the engine and generator claimed and described herein is available for any application and is not limited to use with an unmanned undersea vehicle.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An integrated engine and generator, comprising:
   a stationary shaft;
   an engine block rotatable about said shaft with said block having a plurality of cylinders and each of said cylinders including a piston translating in rectilinear motion while rotating about said shaft;
   a generator housing and stator surrounding said engine block with said stator comprising stator windings wound into said generator housing;
   magnets affixed to an outer curvilinear surface of said engine block to rotate with said engine block, said magnets separated from said generator housing by an air gap;
   wherein said stator windings are electrically configured to match pole pairs of said magnets to generate induced electrical current upon engine block rotation; and
   wherein a magnetic flux is able to pass through the air gap.

2. The integrated engine and generator of claim 1, wherein said engine is selected from the group consisting of an external combustion engine, a spark ignition internal combustion engine and a compression ignition internal combustion engine.

3. The integrated engine and generator of claim 1, wherein said magnets are surface mounted to the outer curvilinear surface of said engine block.

4. The integrated engine and generator of claim 1, wherein said permanent magnets are embedded into the outer curvilinear surface of said engine block.

5. The integrated engine and generator of claim 1, wherein said magnets are straight magnets.

6. The integrated engine and generator of claim 1, wherein said magnets are skewed magnets.

7. The integrated engine and generator of claim 1, further comprising a swash plate fixed to said shaft.

8. The integrated engine and generator of claim 7, further comprising a wobbler plate connected by a bearing assembly to rods connected to each said piston of each said cylinder.

\* \* \* \* \*